(12) United States Patent
Teichmann

(10) Patent No.: US 9,463,696 B2
(45) Date of Patent: Oct. 11, 2016

(54) SYSTEMS AND METHODS FOR MOBILE POWER CONDITIONING PLATFORM

(75) Inventor: Ralph Teichmann, Schenectady, NY (US)

(73) Assignee: General Electric Company, Schenectady, NY (US), ( * ) Notice: Subject to any disclaimer, the term of this patent is extended or adjusted under 35 U.S.C. 154(b) by 1103 days.

(21) Appl. No.: 13/552,404

(22) Filed: Jul. 18, 2012

(65) Prior Publication Data

US 2014/0021779 A1   Jan. 23, 2014

(51) Int. Cl.
| | |
|---|---|
| *B60L 1/00* | (2006.01) |
| *G05F 1/00* | (2006.01) |
| *H02J 4/00* | (2006.01) |
| *B60L 3/00* | (2006.01) |
| *B60L 11/18* | (2006.01) |
| *H02J 15/00* | (2006.01) |

(52) U.S. Cl.
CPC ............ *B60L 3/0046* (2013.01); *B60L 3/0069* (2013.01); *B60L 11/1816* (2013.01); *B60L 11/1846* (2013.01); *B60L 11/1848* (2013.01); *H02J 4/00* (2013.01); *H02J 15/00* (2013.01); *B60L 2200/10* (2013.01); *B60L 2200/26* (2013.01); *B60L 2200/32* (2013.01); *B60L 2200/36* (2013.01); *B60L 2210/30* (2013.01); *B60L 2210/40* (2013.01); *B60L 2230/26* (2013.01); *B60L 2230/30* (2013.01); *B60L 2230/32* (2013.01); *B60L 2240/622* (2013.01); *Y02T 10/7005* (2013.01); *Y02T 10/7088* (2013.01); *Y02T 10/7241* (2013.01); *Y02T 10/7291* (2013.01); *Y02T 90/121* (2013.01); *Y02T 90/127* (2013.01); *Y02T 90/128* (2013.01); *Y02T 90/14* (2013.01); *Y02T 90/16* (2013.01); *Y02T 90/162* (2013.01); *Y02T 90/163* (2013.01); *Y02T 90/169* (2013.01); *Y04S 30/14* (2013.01); *Y10T 307/718* (2015.04)

(58) Field of Classification Search
None
See application file for complete search history.

(56) References Cited

U.S. PATENT DOCUMENTS

| | | | | |
|---|---|---|---|---|
| 5,642,270 | A * | 6/1997 | Green et al. | 363/17 |
| 6,380,637 | B1 * | 4/2002 | Hsu et al. | 290/1 R |
| 2002/0080636 | A1 * | 6/2002 | Delbridge | 363/131 |
| 2002/0153726 | A1 | 10/2002 | Sumner | |
| 2005/0279242 | A1 | 12/2005 | Maier et al. | |
| 2007/0093280 | A1 * | 4/2007 | McKay | 455/574 |
| 2011/0196692 | A1 | 8/2011 | Chavez, Jr. et al. | |
| 2012/0005031 | A1 * | 1/2012 | Jammer | B60L 11/1816 705/16 |
| 2012/0112697 | A1 * | 5/2012 | Heuer | B60L 11/1818 320/109 |
| 2013/0257143 | A1 * | 10/2013 | Ford et al. | 307/9.1 |

FOREIGN PATENT DOCUMENTS

WO   2012/057846 A1   5/2012

OTHER PUBLICATIONS

International search report issued in connection with WO Application No. PCT/US13/044513, Dec. 10, 2013.

* cited by examiner

Primary Examiner — Jared Fureman
Assistant Examiner — Joel Barnett
(74) Attorney, Agent, or Firm — Sutherland Asbill & Brennan LLP

(57) ABSTRACT

Systems and methods for a mobile power conditioning platform are disclosed. According to one embodiment of the invention, a mobile power conditioning platform is positioned proximate to a power grid, coupled to the power grid via an offboard power coupling, coupled to an onboard electrical system of a vehicle via a vehicle power coupling, and transfers electric power between the power grid and the onboard electrical system. One or more onboard generators of the vehicle may modify operation at least partly in response to the transfer of electric power.

15 Claims, 3 Drawing Sheets

SYSTEMS AND METHODS FOR MOBILE POWER CONDITIONING PLATFORM

TECHNICAL FIELD

Embodiments of the invention relate generally to power conditioning, and more particularly, to mobile power conditioning systems and methods for using mobile power conditioning platforms.

BACKGROUND

Operation of onboard vehicle power generation systems while docked, moored, parked, and so forth may result in vehicle fuel consumption, emission of combustion by products, noise, and so forth. Excess fuel consumption may result in additional expense while excess emissions and noise may be bothersome or otherwise inconvenient.

BRIEF DESCRIPTION OF THE INVENTION

Some or all of the above needs and/or problems may be addressed by certain embodiments of the invention. Certain embodiments may include systems for a mobile power conditioning platform and methods for using the mobile power conditioning platform.

According to one embodiment of the invention, there is disclosed a system. The system can include a power conditioning unit configured to accept electrical power with a first set of one or more characteristics and output electrical power with a second set of one or more characteristics. The system can also include an offboard power coupling configured to couple the power conditioning unit to a power grid. Further, the system can include an onboard power coupling configured to couple the power conditioning unit to an onboard electrical system of a vehicle. The system can also include a power storage unit coupled to the power conditioning unit and configured to store and distribute electrical power. Moreover, the system can include a propulsion unit coupled to the power storage unit, the power conditioning unit, or both and configured to relocate the system from a first location to a second location.

Also disclosed herein is a method of deploying the mobile power conditioning platform. In one implementation, the method can include coupling a mobile power conditioning platform to a power grid, coupling the mobile power conditioning platform to an onboard electrical system, and transferring electrical power between the power grid and the onboard electrical system.

Also disclosed herein is a system. The system can include a chassis. The system can also include a power conditioning unit coupled to the chassis and configured to accept electrical power with a first set of one or more characteristics and output electrical power with a second set of one or more characteristics. Further, the system can include an offboard power coupling coupled to the chassis and configured to couple the power conditioning unit to a power grid. The system can also include an onboard power coupling coupled to the chassis and configured to couple the power conditioning unit to an onboard electrical system. Moreover, the system can include a coupling configured to couple the chassis to a prime mover.

Other embodiments, systems, methods, apparatus aspects, and features of the invention will become apparent to those skilled in the art from the following detailed description, the accompanying drawings, and the appended claims.

BRIEF DESCRIPTION OF THE DRAWINGS

The detailed description is set forth with reference to the accompanying drawings, which are not necessarily drawn to scale. The use of the same reference numbers in different figures indicates similar or identical items.

DETAILED DESCRIPTION OF EMBODIMENTS OF THE INVENTION

Illustrative embodiments of the invention will now be described more fully hereinafter with reference to the accompanying drawings, in which some, but not all embodiments of the invention are shown. The invention may be embodied in many different forms and should not be construed as limited to the embodiments set forth herein; rather, these embodiments are provided so that this disclosure will satisfy applicable legal requirements. As noted above, like numbers refer to like elements throughout.

Illustrative embodiments of the invention are directed to, among other things, a mobile power conditioning platform (MPCP). As an overview, vehicles such as ships, barges, aircraft, trains, and so forth have an onboard electrical system which includes onboard sources including generators, power storage units such as batteries, and so forth. During operation of these vehicles, vehicle systems such as lighting, pumps, and so forth utilize electrical power to carry out various functions. While docked, moored, parked, and so forth, the MPCP may be used to couple the vehicle to a power grid such that electrical power is provided to the vehicle from an external source such as an electric utility, rather than from the onboard sources. The MPCP may thus provide at least a portion of the electrical power needed for the vehicle functions while docked, moored, parked, and so forth.

The MPCP is configured to be mobile, that is, be repositioned from a first location to a second location. This repositioning may be facilitated using an onboard prime mover such as an electric motor powered by a power storage unit, or by an external prime mover such as a tractor truck. Mobility of the MPCP allows for rapid deployment of the system from one ship to another. This improves flexibility in resource utilization, by allowing vehicles to dock, moor, park, and so forth at different locations while still having access to the MPCP for power transfer.

By providing power suitable for consumption by an onboard electrical system, use of onboard power generation systems may curtailed or discontinued. For example, an onboard generator consuming fossil fuels may be shut down when power is provided by the electric utility. Such a shutdown may reduce combustion emissions, noise, and so forth in the vicinity of the vehicle. Additionally, such a shutdown may reduce fuel consumption by the vehicle. The technical effects of certain embodiments of the invention may include, but are not limited to, reducing carbon emissions, reducing fuel consumption, reducing noise, and improving environmental quality.

Figure 1:
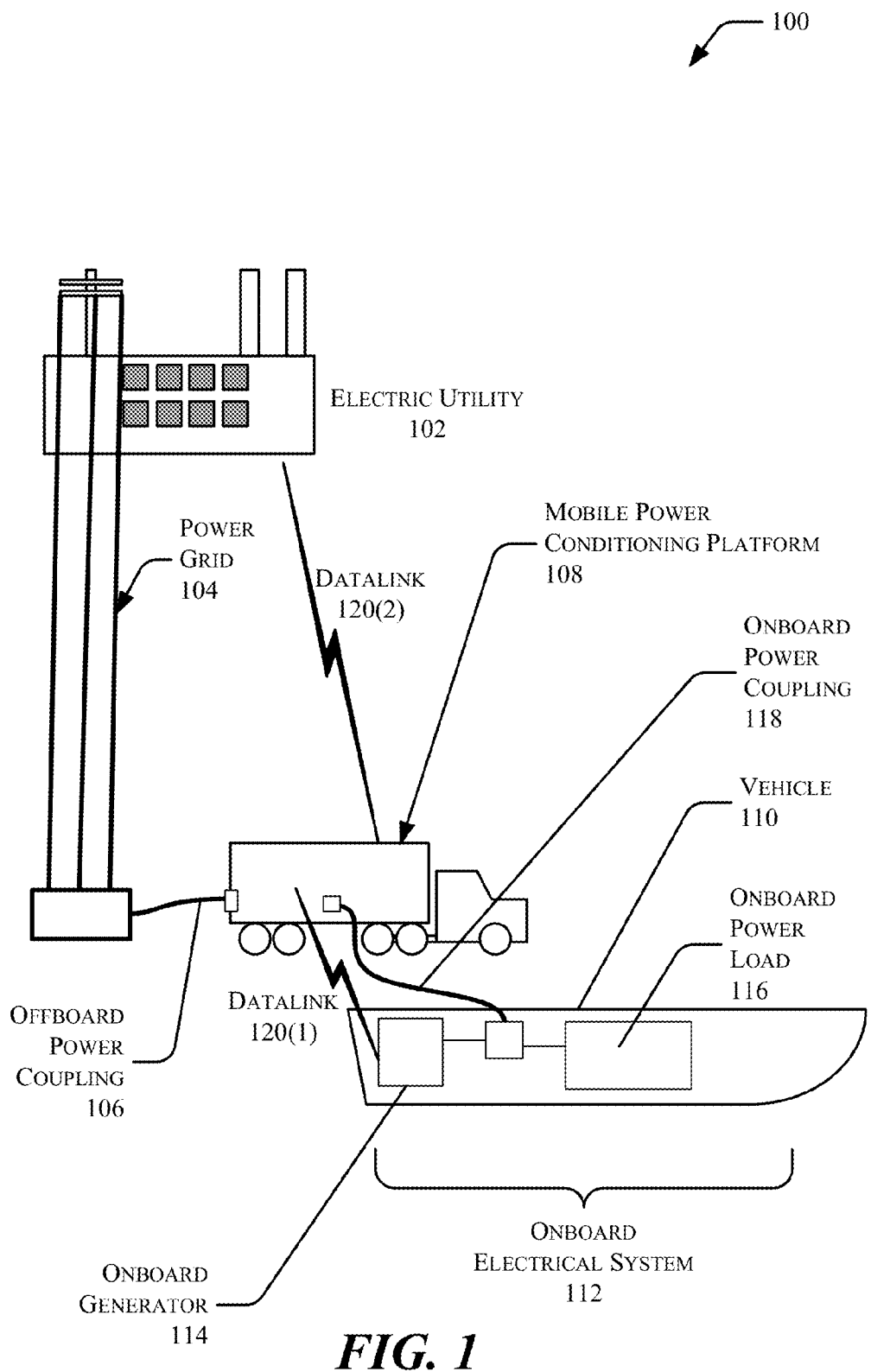
FIG. 1 is a diagram of an architecture comprising a mobile power conditioning platform according to an embodiment of the invention.

FIG. 1 is a diagram of an architecture 100 comprising a mobile power conditioning platform. An electric utility 102 provides electric power to a power grid 104. The electric utility 102 may generate the electric power using photovoltaic, wind, tidal action, chemical combustion, nuclear, and so forth. The power grid 104 is configured to transfer electrical power between the electric utility 102 and electrical consumers, such as a ship. This power may have one or more particular characteristics, such as frequency, voltage, amperage, phase, waveform, alternating current or direct current.

An offboard power coupling 106 is configured to couple the power grid 104 to a mobile power conditioning platform (MPCP) 108. The offboard power coupling 106 may comprise one or more electrical contacts, inductors, capacitors, and so forth. For example, in one implementation the offboard power coupling 106 may comprise a receptacle on the MPCP 108 to which one or more cables may connect to the power grid 104. In the case of direct physical connectivity such as using cables, the MPCP 108 may be placed proximate to an access point or coupling of the power grid 104.

The MPCP 108 may also be placed proximate to a vehicle 110 such as a ship, train, aircraft, and so forth. The vehicle 110 has an onboard electrical system 112. This onboard electrical system 112 uses electrical power having one or more particular characteristics, such as frequency, voltage, amperage, phase, waveform, alternating current or direct current. The electrical power characteristics of the power grid 104 and the onboard electrical system 112 may differ. For example, the power grid 104 may provide alternating current at 220 volts and 50 Hz frequency while the onboard electrical system utilizes 440 volts at 60 Hz.

The onboard electrical system 112 may comprise an onboard generator 114 configured to provide electrical power to an onboard power load 116. The onboard power load 116 may comprise lighting, emergency systems, refrigeration, handling equipment, and so forth.

An onboard power coupling 118 couples the vehicle 110 to the MPCP 108. The onboard power coupling 118 may comprise one or more electrical contacts, inductors, capacitors, and so forth. For example, in one implementation, the onboard power coupling 118 may comprise a receptacle on the MPCP 108 to which one or more cables may connect to the vehicle 110. In the case of direct physical connectivity such as using cables, the MPCP 108 may be placed proximate to an access point or coupling of the vehicle 110.

The MPCP 108 is configured to provide power conditioning and transfer between the power grid 104 and the vehicle 110. Power conditioning comprises adjusting electrical power from a first set of electrical characteristics to a second set of electrical characteristics. Continuing the example above, the MPCP 108 may provide power conditioning which renders the 440 volts and 60 Hz electrical power of the power grid 104 at the offboard power coupling 106 as 220 volts at 50 Hz for the onboard electrical system 112 at the onboard power coupling 118.

Power conditioning may also include providing power to address voltage dips or spikes, mitigate brief outages, and so forth. For example, the MPCP 108 may provide momentary electrical power from a power storage unit to cope with surge demand from the vehicle 110, such as when a large electric motor is started.

While the MPCP 108 has been discussed as providing power transfer from the power grid 104 to the vehicle 110, this transfer may be reversed. In this implementation, the vehicle 110 may generate electrical power such as on the onboard generator 114 and provide electrical power to a load coupled to the offboard power coupling 106. For example, the vehicle 110 may provide electrical power to shore facilities via the MPCP 108.

Figure 2:
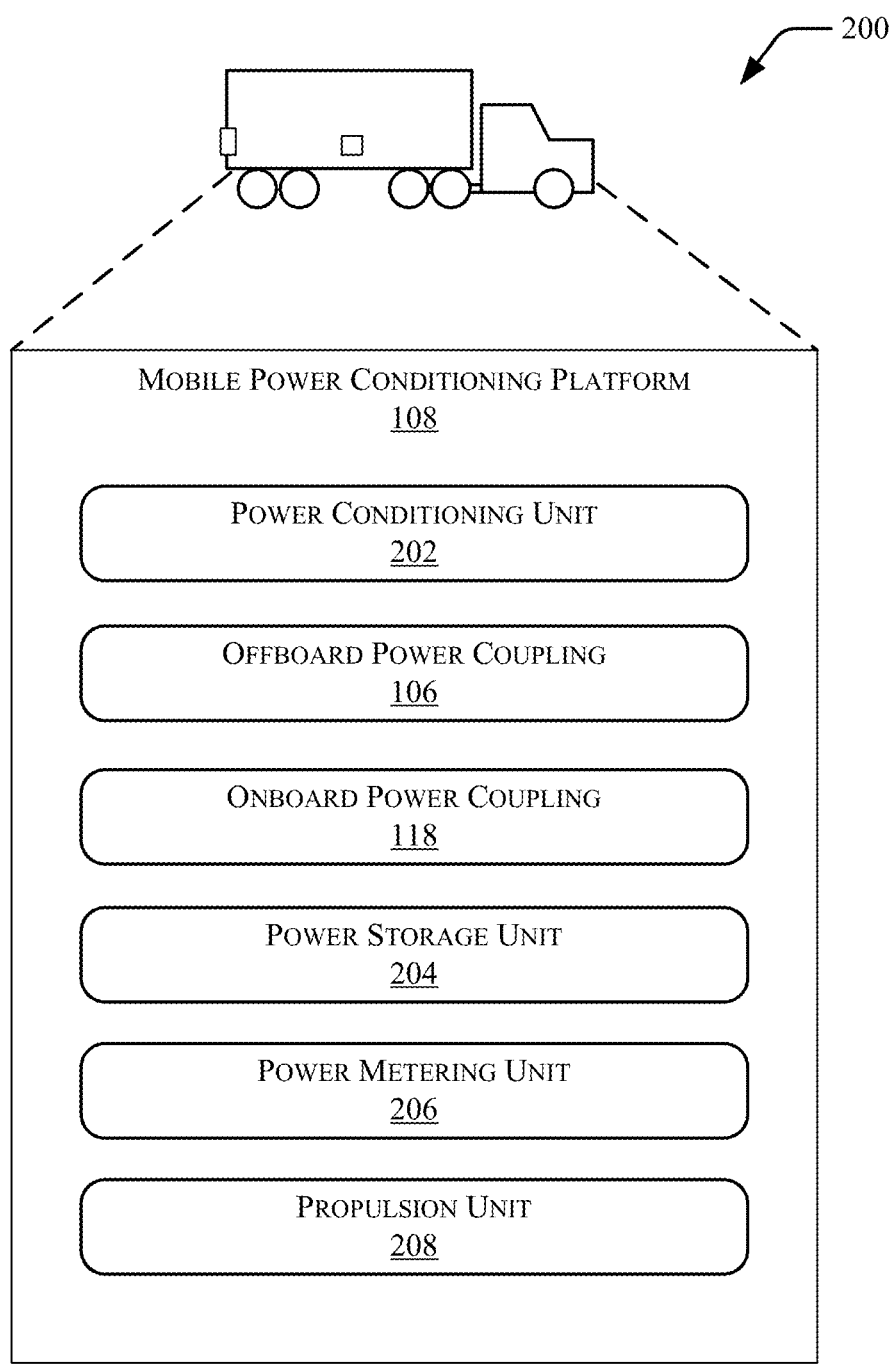
FIG. 2 is a block diagram of the mobile power conditioning platform according to an embodiment of the invention.

FIG. 2 is a block diagram 200 of the mobile power conditioning platform (MPCP) 108 according to an embodiment of the invention. The MPCP 108 may be provided in one or more form factors. In one implementation, the MPCP 108 may comprise a chassis upon or onto which the following apparatus may be mounted. In other implementations the MPCP 108 may comprise a chassis in the form of a trailer, a cargo container, or a cargo-container-sized assembly. These form factors may, in some situations, be selected to use available handling equipment such as overhead cranes, tractor trucks, and so forth.

A power conditioning unit 202 is present in the MPCP 108. The power conditioning unit 202 may include one or more transformers, inverters, variable frequency transformers, rectifiers, and so forth. The power conditioning unit 202 is configured to accept electrical power having a first set of one or more characteristics and output electrical power with a second set of one or more characteristics. These characteristics include, but are not limited to, frequency, voltage, amperage, phase, waveform, and alternating current or direct current.

The power conditioning unit 202 may be configured to provide the power flow link with or without galvanic isolation between the input and output.

The offboard power coupling 106 is coupled to the power conditioning unit 202 and configured to send, receive, or send and receive electrical power to the grid 104. The onboard power coupling 118 is also coupled to the power conditioning unit 202 and is configured to send, receive, or send and receive electrical power to the vehicle 110.

In some implementations, the power conditioning unit 202 may be configured to send, receive, or both send and receive data to the power grid 104, the vehicle 110, or both via datalinks 120. This data may be used to manage operation of the MPCP 108. For example, the onboard power coupling 118 may include a datalink 120(1) via which the vehicle 110 notifies the power conditioning unit 202 that power demands will be increasing, such as in response to the activation of a large motor in a refrigeration unit. Once notified, the power conditioning unit 202 may activate additional power conditioning circuitry, increase cooling system operation, and so forth as called for to handle the anticipated load. A datalink 120(2) may also be maintained between the MPCP 108 and the electric utility 102.

The datalink(s) 120 may exchange data wirelessly, using dedicated cabling, by imposing a signal onto the power coupling, or via a combination thereof. In one implementation, a radio connection such as via the WiFi wireless standard with encryption to provide security for the datalink 120(1) may be used. The MPCP 108 may establish the datalink 120(2) using a wired connection. For example, in some implementations, the offboard power coupling 106 may include one or more conductors suitable for transferring data signals using Ethernet.

The power conditioning unit 202 may be configured to decouple at least a portion of the offboard power coupling 106, the onboard power coupling 118, or both at least partly in response to a set of pre-determined conditions. These pre-determined conditions may comprise an arc fault, a ground fault, a short circuit, an overload, a change in alternating current frequency, an equipment fault, or a combination thereof. For example, the power conditioning unit 202 may determine that the onboard electrical system 112 is drawing power which exceeds a safe operating limit previously determined for the MPCP 108. In response, the MPCP 108 may limit the amperage delivered, alter the frequency, or disconnect the vehicle 110 from the MPCP 108. This disconnection may be accomplished via a solenoid operated switch, silicon controlled rectifier, and so forth.

The power conditioning unit 202 may coordinate coupling and decoupling actions. This coordination may comprise opening or closing breakers in a particular sequence. These may be breakers coupled to the offboard power coupling 106, the onboard power coupling 118, or both. For example, during decoupling triggered at least in part by an overload, the power conditioning unit 202 may disconnect onboard refrigeration equipment first and decouple onboard emergency systems later. The power conditioning unit may thus be configured to provide for intelligent load addition and shedding.

As mentioned above, the power conditioning unit 202 may have a datalink 120(2) with the power grid 104 and the electric utility 102 providing power thereto. This datalink 120(2) may be used to provide for a smooth transition between ship and shore power without causing potentially service interrupting problems for the electric utility 102. For example, before transferring power to the vehicle 110 from the power grid 104, the MPCP 108 may determine the anticipated load by the vehicle 110 and coordinate with the electric utility 102 to bring online reserves capable of meeting the anticipated load. For example, suddenly coupling a cruise ship which requires about 15 MW to the power grid 104 may result in a brownout, blackout, or other operational difficulties to the electric utility 102. In this example, the MPCP 108 may communicate with the electric utility 102 indicating the anticipated load and requesting sufficient operating reserves be called into play to meet the expected demand. Once the electric utility 102 has brought those reserves online, the MPCP 108 may receive a signal that power is available, and begin power transfer to the vehicle 110. Likewise, coordination with the one or more onboard generators 114 may take place to reduce or eliminate stress on onboard equipment in transitioning from a loaded state to no load.

In some implementations, the power conditioning unit 202 may comprise one or more modules. These modules may be added or subtracted to provide for different vehicle 110 loads. Modules which may be added or removed include, but are not limited to, additional inverter modules, cooling modules, transformer modules, and so forth. For example, the MPCP 108 may use a first transformer module rated for about 6600 VA which is suitable for a relatively small onboard power load 116 of a fishing trawler. After the trawler leaves, the MPCP 108 moves to provide power to a large luxury cruise ship. To support the larger onboard power load 116, an additional transformer module is added to provide capacity for up to about 13200 VA.

In some implementations, the power conditioning unit 202 may be configured to transfer a minimum of over 1 MW to the onboard power coupling 118.

Portions of the power conditioning unit 202 may, in some implementations, be distributed between the MPCP 108 chassis and the vehicle 110. In one implementation, the power conditioning unit 202 of the MPCP 108 may be configured to deliver direct current power to the onboard power coupling 118. Complementary equipment onboard the vehicle 110 and coupled to the onboard electrical system 112 may be configured to accept the direct current provided and provide power with characteristics suitable for use by the vehicle 110. By providing direct current at the MPCP 108-vehicle 110 interface, frequency matching issues associated with alternating current are avoided. Furthermore, this complementary equipment onboard the vehicle 110 may be incorporated at least in part into a prime mover mechanism of the vehicle 110. Thus, the complementary equipment would be useable both while in motion and while stationary which maximizes overall efficiency of the vehicle 110.

A power storage unit 204 of the MPCP is configured to store electrical energy. This unit may comprise one or more batteries, flywheels, capacitors, fuel cells, or a combination thereof which are configured to receive and release electrical power. For example, the batteries may comprise a bank of lead acid cells configured to allow for deep charge and discharge profiles. The flywheel may store electrical energy as kinetic energy in the form of a spinning flywheel. A motor, a generator, or a combination motor/generator is configured to spin the flywheel thus storing energy or extracting kinetic energy from the spinning flywheel in the form of electrical energy.

In some implementations, the power storage unit 204 may comprise one or more modules. These modules may be added or subtracted to provide for capabilities by the MPCP 108. For example, where the MPCP 108 is coupled to a ship having a cargo requiring high transient power during startup of equipment, such as a large refrigeration compressor, the power storage unit 204 may comprise batteries for movement and operation of MPCP 108 components while a flywheel module provides high transient power for load leveling.

In another implementation, the power storage unit 204 may be configured with additional capacity such that it may be used by the power conditioning unit 202 to provide an uninterruptible power supply. In this implementation, the power storage unit 204 may comprise several battery modules.

The power modules may include fuel cells. These fuel cells may be operated in a closed loop cycle or an open loop cycle. For example, when power is demanded from the closed loop cycle fuel cell using hydrogen-oxygen, electrical energy is extracted, producing water. When excess power is available such as from the power grid 104, the water may be electrolyzed to produce hydrogen and oxygen for use at a later time. When operated in the open loop cycle, the fuel cell exhaust is not reused. Continuing the example, the water would be vented.

A power metering unit 206 is configured to monitor and measure attributes associated with the transfer of power. This may include power at the offboard power coupling 106, the onboard power coupling 118, within the MPCP 108, or a combination thereof. These attributes include power transferred in watts, amps, volts, frequency, and so forth. For example, the power metering unit 206 may determine that for a three day period, 15 megawatt hours of power were transferred to the vehicle 110.

These attributes may also be compared with pre-defined boundaries to determine deviation from a preferred value. Continuing the example, the power metering unit 206 may determine that during the three day period power provided to the vehicle 110 at the onboard power coupling 118 did not vary more than about 0.5 Hz from the about 50 Hz required and that maximum voltage excursions of about ±4 volts relative to about 220 volts were experienced. This deviation may then be used for various purposes, including compliance with service level agreements.

The power metering unit 206 may be coupled to the power conditioning unit 202. This coupling may include the transfer of data. For example, the power metering unit 206 may provide power usage statistics to the power conditioning unit 202 which may use this information to modify operations.

The power metering unit 206 may also couple to other resources via the datalink(s) 120. In one implementation, the power metering unit 206 may be configured to transmit data as to usage and performance via the datalink 120 to a third-party. For example, the MPCP 108 may send usage information to an administrative office of a port. This usage information may then be used to bill a ship for the services provided and the power used.

A propulsion unit 208 is configured to provide for relocation of the MPCP 108 from a first physical location to a second physical location. For example, the propulsion unit 208 may be configured to move the MPCP 108 from one berth to another on a quay. Where the MPCP 108 is used on land, the propulsion unit may comprise one or more electric motors coupled to one or more wheels or conveyors. In some implementations, the MPCP 108 may be configured to move on rails.

The propulsion unit 208 may also comprise operator controls configured to direct the relocation of the system from the first location to the second location; for example, a steering wheel and throttle suitable for use by a human operator. In some implementations, the MPCP 108 may be moved free from human intervention using an automated system.

In one design, the propulsion unit is powered from an on-board energy storage system, such as batteries, which energy is replenished when the MPCP 108 is stationary in one physical location by siphoning off a small amount of power from the large amount of power transferred and conditioned between the input and output.

The MPCP 108 may also be configured for portable use on water. For example, the MPCP 108 may be configured in a barge or skiff. In such a configuration, the propulsion unit 208 may comprise one or more electric motors coupled to a propeller configured for operation in an aqueous medium. As above, the propulsion unit 208 may also comprise operator controls configured to direct the relocation of the system from the first location to the second location.

In another implementation, the propulsion unit 208 may be on a chassis separate from the MPCP 108. In this implementation, the MPCP 108 chassis may include a coupling. This coupling is configured to attach the MPCP 108 to a prime mover. For example, the coupling may comprise one or more lift points for a crane, a tow hitch for coupling to a tractor vehicle, and so forth. In this implementation, the coupling may comprise an electrical coupling suitable for transferring at least some electrical power from the power storage unit 204 to the prime mover during relocation.

Figure 3:
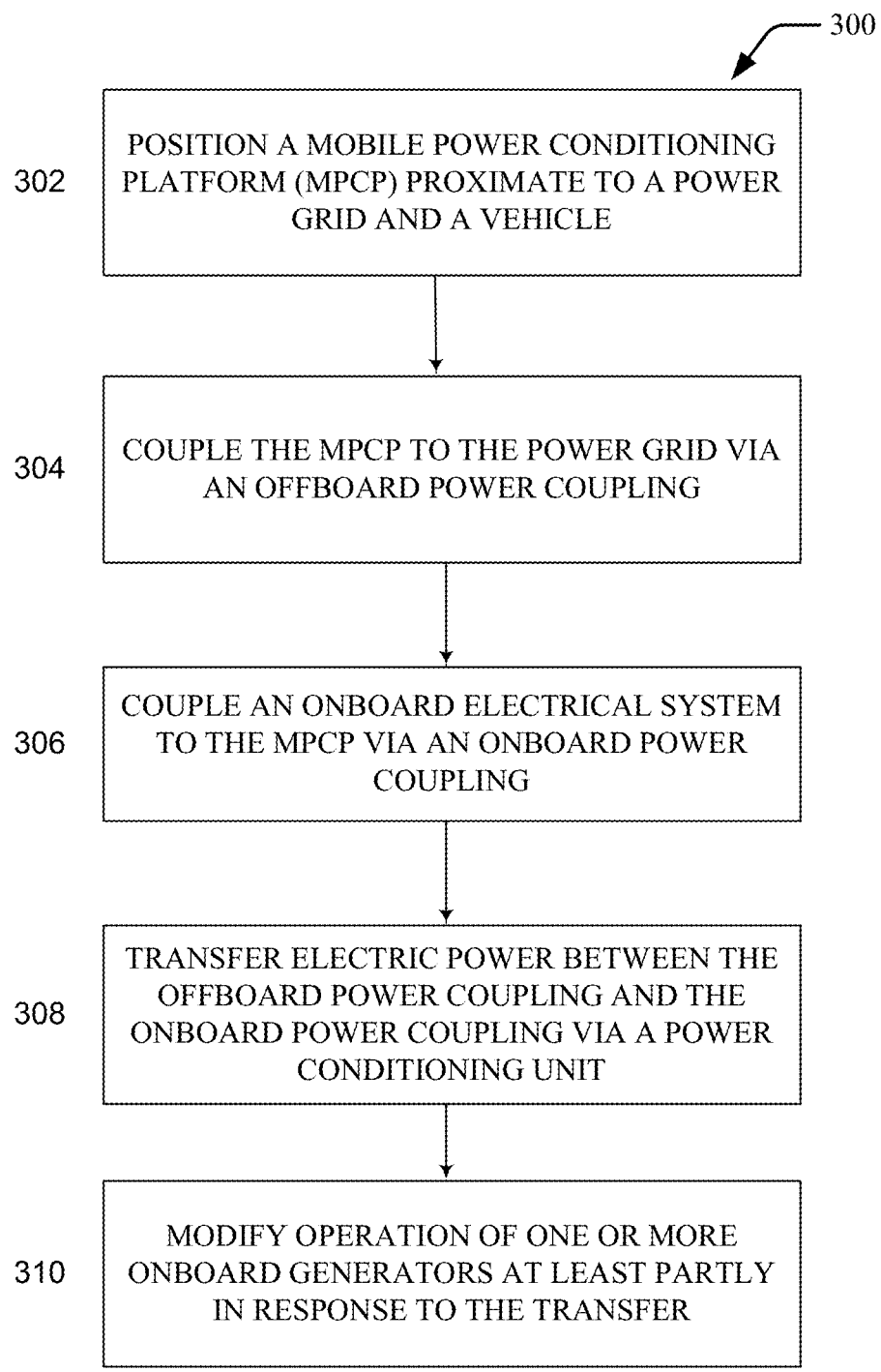
FIG. 3 is a flow diagram of a process of providing electrical power using the mobile power conditioning platform according to an embodiment of the invention.

FIG. 3 is a flow diagram 300 of a process of providing electrical power using the MPCP 108 according to an embodiment of the invention. Each of the blocks represents one or more operations which may be carried out to effect the process.

Block 302 positions the MPCP 108 proximate to the power grid 104 and the vehicle 110. For example, the MPCP 108 may drive under its own power using an integral prime mover to a quay adjacent to a cargo vessel's berth and near a connection point to the power grid 104. The positioning may involve drawing electrical power from the power storage unit 204 onboard the MPCP 108 to drive one or more electrical motors coupled to wheels or conveyors configured to move the MPCP 108. In implementations where the MPCP 108 is waterborne, the one or more electrical motors may be coupled to one or more propellers, pumpjets, and so forth.

Block 304 couples the MPCP 108 to the power grid 104 via the offboard power coupling 106. In one implementation, an operator may couple electrical lines between a receptacle of the power grid 104 and the offboard power coupling 106. In another implementation, the coupling may occur automatically or semi-automatically.

Block 306 couples the onboard electrical system 112 to the MPCP 108 via the onboard power coupling 118. In one implementation, an operator may couple electrical lines between a receptacle of the vehicle 110 and the onboard power coupling 118. In another implementation, the coupling may occur automatically or semi-automatically, such as in conjunction with berthing.

Block 308 transfers electric power between the offboard power coupling 106 and the onboard power coupling 118 via the power conditioning unit 202. For example, power is accepted from the power grid 104, conditioned, and provided for use by the onboard electrical system 112. As described above, the transfer may comprise accepting input electrical power having a first set of one or more characteristics and outputting electrical power having a second set of one or more characteristics. These characteristics include, but are not limited to, magnitude and/or tolerance, range of frequency, voltage, amperage, phase, waveform, or alternating current or direct current.

Block 310 modifies the operation of one or more onboard generators 114 at least partly in response to the transferring of electrical power. For example, with power from the power grid 104 being provided via the MPCP 108 to the onboard electrical system 112, an onboard diesel generator may be idled or shut down. At least in part of this change in operation of the generator, diesel exhaust in the vicinity of the vehicle 110 is reduced or eliminated. As described above, this modification may occur in coordination with the electric utility 102 via the datalinks 120 and the power conditioning unit 202 of the MPCP 108.

Illustrative systems and methods of mobile power conditioning are described above. Some or all of these systems and methods may, but need not, be implemented at least partially by an architecture such as those shown in FIGS. 1-3. It should be understood that certain acts in the methods need not be performed in the order described, may be rearranged or modified, and/or may be omitted entirely, depending on the circumstances. Also, any of the acts described above with respect to any method may be implemented by any number of processors or other computing devices based on instructions stored on one or more computer-readable storage media.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:

1. A system, comprising:
   a mobile power conditioning platform configured to transfer electrical power over a first period of time between a power grid and a first vehicle at a first location, the mobile power conditioning platform further configured to move to a second location after the first period of time and to transfer electrical power over a second period of time between the power grid and a second vehicle at the second location;

an offboard power coupling configured to couple the mobile power conditioning platform to the power grid;

an onboard power coupling configured to couple the power conditioning unit to an onboard electrical system of a respective one of the first vehicle or the second vehicle;

a first datalink that communicatively couples the mobile power conditioning platform to at least one of the power grid or a utility company associated with the power grid, the first datalink operative to communicate information between the mobile power conditioning platform and the at least one of the power grid or the utility company; and a second datalink that communicatively couples the mobile power conditioning platform to the respective one of the first vehicle or the second vehicle, the second datalink operative to at least receive in the mobile power conditioning platform, a notification from the respective one of the first vehicle or the second vehicle indicating an anticipated load and requesting sufficient operating reserves be brought online to meet an expected change in power demand due to the anticipated load.

2. The system of claim 1, the mobile power conditioning platform further configured to accept electrical power from the offboard power coupling and output electrical power to the onboard power coupling.

3. The system of claim 1, the mobile power conditioning platform further configured to accept electrical power from the onboard power coupling and output electrical power to the offboard power coupling.

4. The system of claim 1, the mobile power conditioning platform further configured to accept power at least in part from a power storage unit located in the mobile power conditioning platform.

5. The system of claim 1, the mobile power conditioning platform further configured to decouple at least a portion of the offboard power coupling, the onboard power coupling, or both at least partly in response to a set of pre-determined conditions.

6. The system of claim 5, the set of pre-determined conditions comprising a ground fault, a short circuit, an overload, or a change in alternating current frequency.

7. The system of claim 1, wherein the mobile power conditioning platform is configured to convert alternating current (AC) electrical power having a first set of characteristics to AC electrical power having a second set of characteristics, wherein each of the first and the second set of characteristics comprises at least one of a frequency, a voltage, an amperage, a phase, or a waveform.

8. The system of claim 1, further comprising a propulsion unit, the propulsion unit comprising:

one or more electric motors coupled to one or more wheels or conveyors of the mobile power conditioning platform; and operator controls configured to direct the relocation of the mobile power conditioning platform from the first location to the second location.

9. The system of claim 1, wherein the mobile power conditioning platform is configured as a waterborne vehicle that includes a propulsion unit, the propulsion unit comprising:

one or more electric motors coupled to a propeller configured for propelling the waterborne vehicle over water.

10. The system of claim 1, wherein the first vehicle is a first ship moored at the first location, the second vehicle is a second ship moored at the second location, and the mobile power conditioning platform is a waterborne vehicle that transfers electrical power between the electrical grid and the first ship over the first period of time, and transfers electrical power between the electrical grid and the second ship over the second period of time.

11. The system of claim 10, wherein the waterborne vehicle is one of a barge or a skiff.

12. The system of claim 1, wherein at least one of the first datalink or the second datalink is a wireless datalink.

13. A method, comprising:

coupling a mobile power conditioning platform to a power grid carrying electrical power;

coupling the mobile power conditioning platform to a first onboard electrical system of a first vehicle parked at a first location;

using a first datalink by the mobile power conditioning platform, to at least obtain a notification from the first vehicle indicating an anticipated load and requesting sufficient operating reserves be brought online to meet an expected change in power demand due to the anticipated load;

transferring electrical power between the power grid and the first onboard electrical system of the first vehicle at least in part on the basis of the expected change in power demand;

moving the mobile power conditioning platform to a second location;

coupling the mobile power conditioning platform to a second onboard electrical system of a second vehicle parked at the second location;

using the first datalink by the mobile power conditioning platform, to obtain power demand information from the second vehicle; and transferring electrical power between the power grid and the second onboard electrical system of the second vehicle.

14. The method of claim 13, the transferring comprising accepting from the power grid, AC electrical power having a first set of one or more characteristics and outputting AC electrical power having a second set of one or more characteristics.

15. The method of claim 13, further comprising:

using a second datalink by the mobile power conditioning platform to communicate with at least one of the power grid or an electric utility associated with the power grid.

* * * * *